United States Patent [19]

Heffernan et al.

[11] 4,047,358
[45] Sept. 13, 1977

[54] METHOD FOR FORMING ARTICLE-HOLDING DISPLAY PACKAGES

[75] Inventors: William Heffernan, Westfield; George R. Hair, Clifton, both of N.J.; John G. Nielsen, Freeport, N.Y.

[73] Assignee: International Inpak Inc., Saddle Brook, N.J.

[21] Appl. No.: 727,002

[22] Filed: Sept. 7, 1976

Related U.S. Application Data

[60] Continuation of Ser. No. 437,314, Jan. 28, 1974, abandoned, which is a division of Ser. No. 205,817, Dec. 8, 1971, Pat. No. 3,788,032.

[51] Int. Cl.$^2$ .................. B29C 17/04; B65B 43/08
[52] U.S. Cl. .................. 53/30 R; 53/22 A; 53/29; 264/89; 264/92
[58] Field of Search .................. 264/89, 90, 92, 93, 264/94, 292, 322; 425/388, 455; 53/30 R, 30 S, 29, 22 A, 184, 184 S; 219/388 R, 388 C, 388 W, 243; 432/8, 59, 227

[56] References Cited

U.S. PATENT DOCUMENTS

| | | | |
|---|---|---|---|
| 2,702,411 | 2/1955 | Winstead | 264/89 |
| 2,926,385 | 3/1960 | Willson, Jr. | 264/89 |
| 3,075,329 | 1/1963 | Swezey et al. | 53/30 S X |
| 3,357,055 | 12/1967 | Swezey | 425/388 |
| 3,394,208 | 7/1968 | Lovas et al. | 264/92 |
| 3,488,413 | 1/1970 | Watts, Jr. | 264/92 X |
| 3,590,434 | 7/1971 | Watts, Jr. | 425/388 X |
| 3,655,940 | 4/1972 | Robinson | 219/243 |
| 3,661,484 | 5/1972 | Psota et al. | 53/184 X |
| 3,770,860 | 11/1973 | Amberg et al. | 264/94 X |
| 3,886,247 | 5/1975 | Edwards | 264/296 X |

Primary Examiner—Jan H. Silbaugh
Attorney, Agent, or Firm—Sheldon H. Parker

[57] ABSTRACT

The articles are enclosed in pockets, formed and sealed in plastic windows, of a foldable paperboard blank which has window openings on opposite sides of a fold line, the blank being covered on one surface by a heat-deformable and heat-sealable plastic sheet, at least over that area having the openings or windows formed therein. A blank support, a molding station and a blank discharge station are arranged along a linear blank travel path at substantially equal spacings from each other. A carrier is oscillatable in a vertical plane including the center line of the travel path, and carries air-released vacuum pick-up means at longitudinal spacings substantially equal to the spacings between the support and the stations. The carrier is oscillated between a first position and a second position. In the first position, a first vacuum pick-up means grips a blank on the support and a second vacuum pick-up means grips a blank, which has already been heated and has pockets formed therein, at the molding station. As the carrier is moved toward its second position, the blanks are lifted and the first pick-up means heats its supported blank. At the second position, the first pick-up means, which includes male die means, positions its blank over a female die means at the molding station, and the second pick-up means releases its formed blank at the discharge station. The already heated blank at the molding station is vacuum deformed into the female die to form the pockets, is released and the cycle is repeated. A dwell station preferably is positioned between the support and the molding station. An endless chain conveyor is moved past the discharge station and carries removable tables for receiving the formed blank. Articles are placed in the pockets at any point along the endless conveyor, and the blanks, during travel along the conveyor on the tables, are folded over to enclose the article and held in closed position while they are delivered to a turret which is revolved in synchronism with the movement of the endless chain and carries one or more, preferably three, piston and cylinder operated heat sealing dies for sealing the two halves of the blank to each other to seal the article in a pocket. The dies are supplied with dielectric energy only after engagement with the folded blanks. The packaged articles are then released onto a conveyor belt for transport away from the apparatus. The heating means for heating the blank preferably is mounted on the carrier, or may be positioned fixedly at a heating station.

2 Claims, 29 Drawing Figures

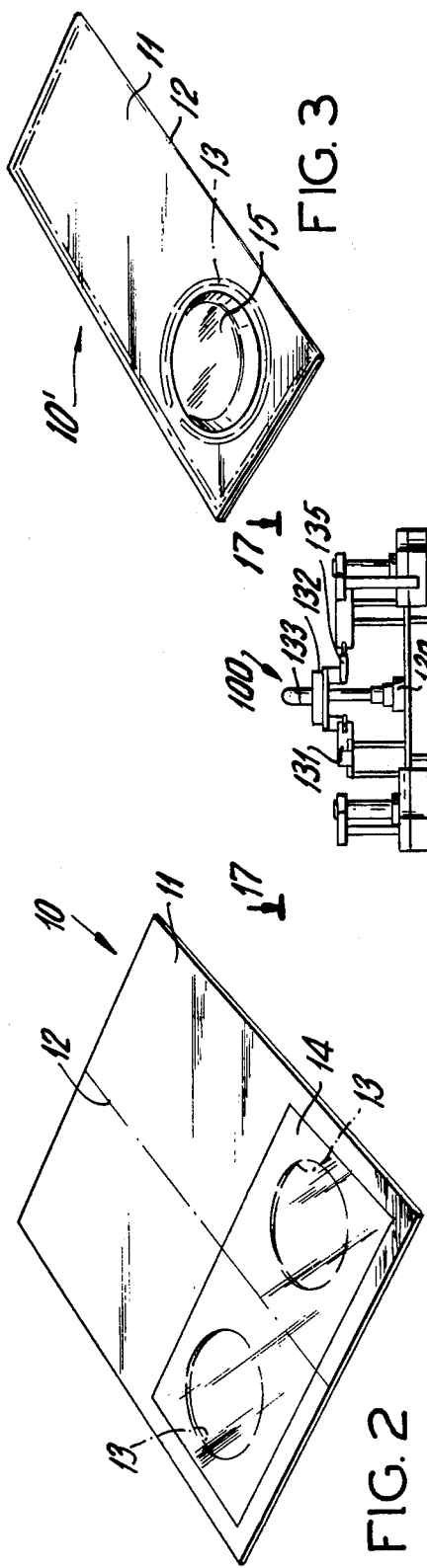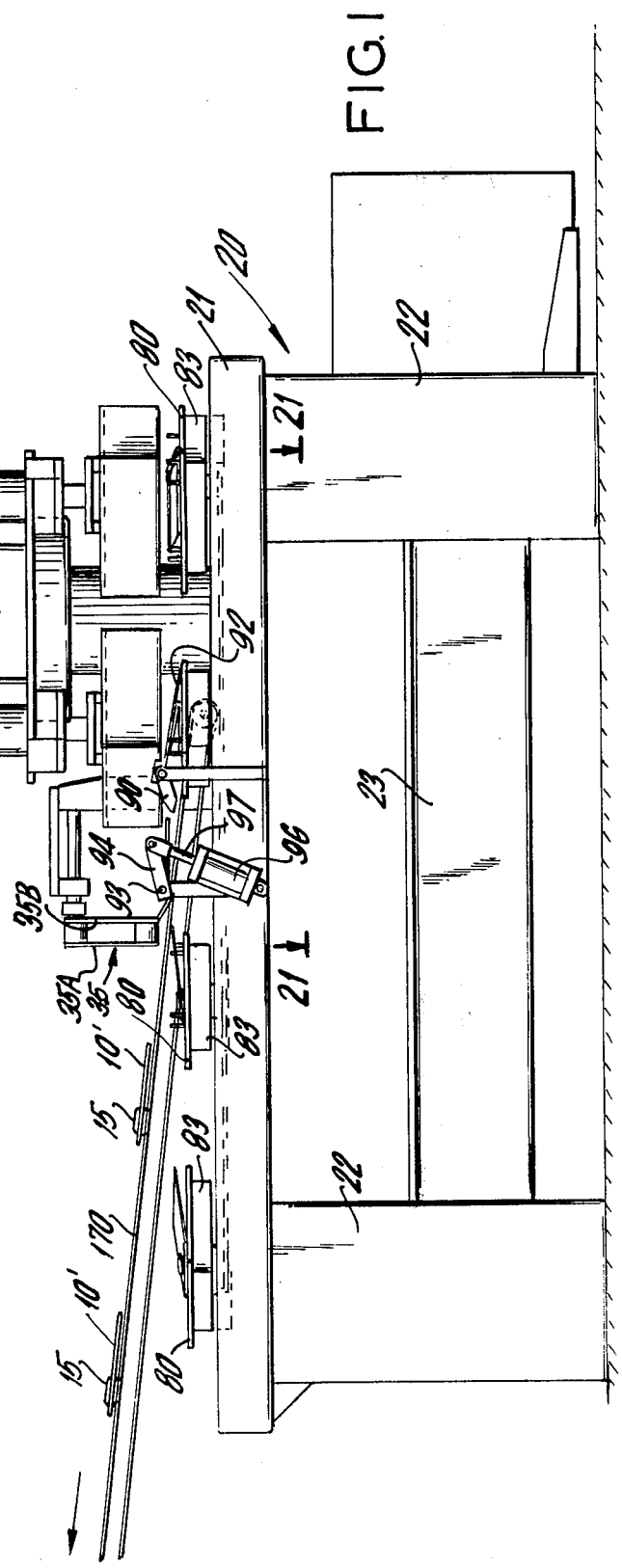

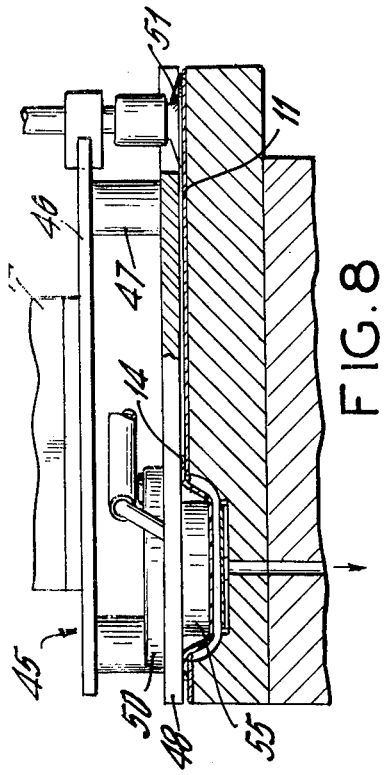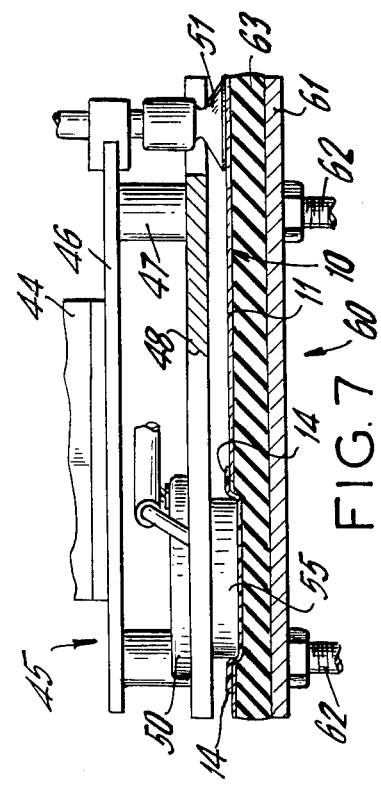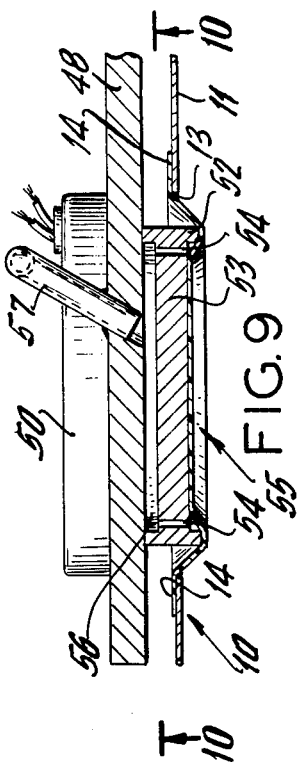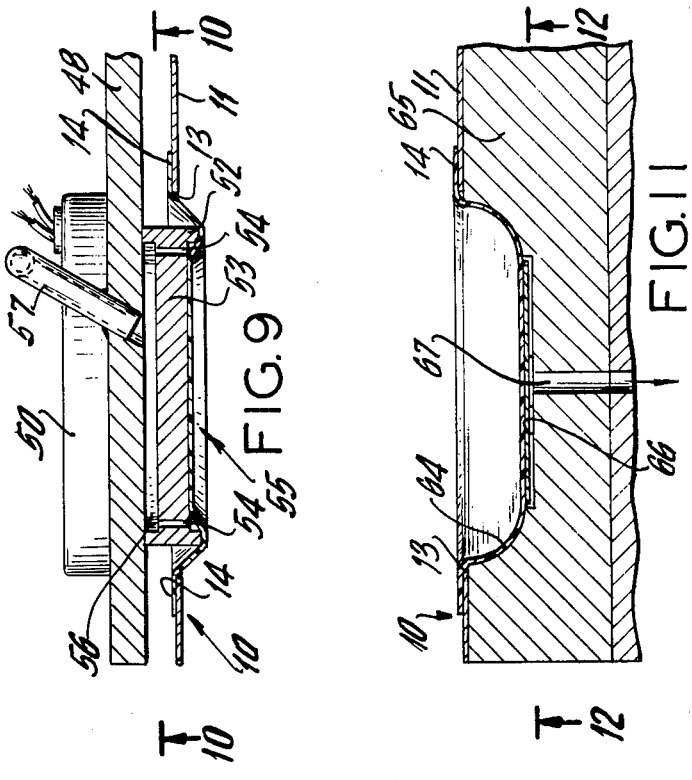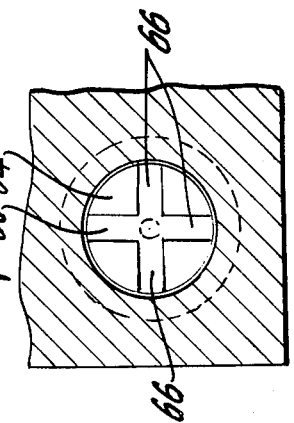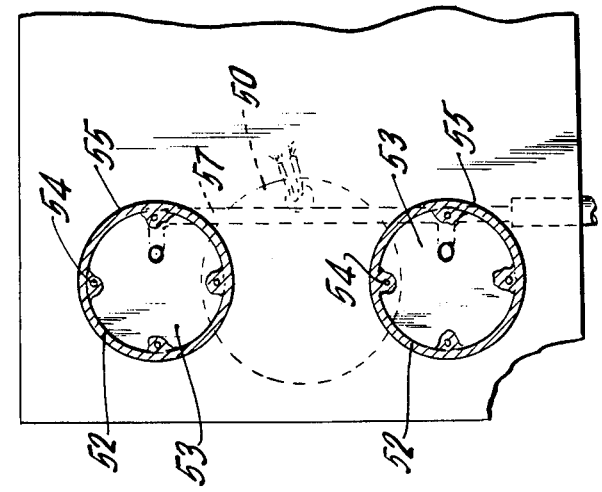

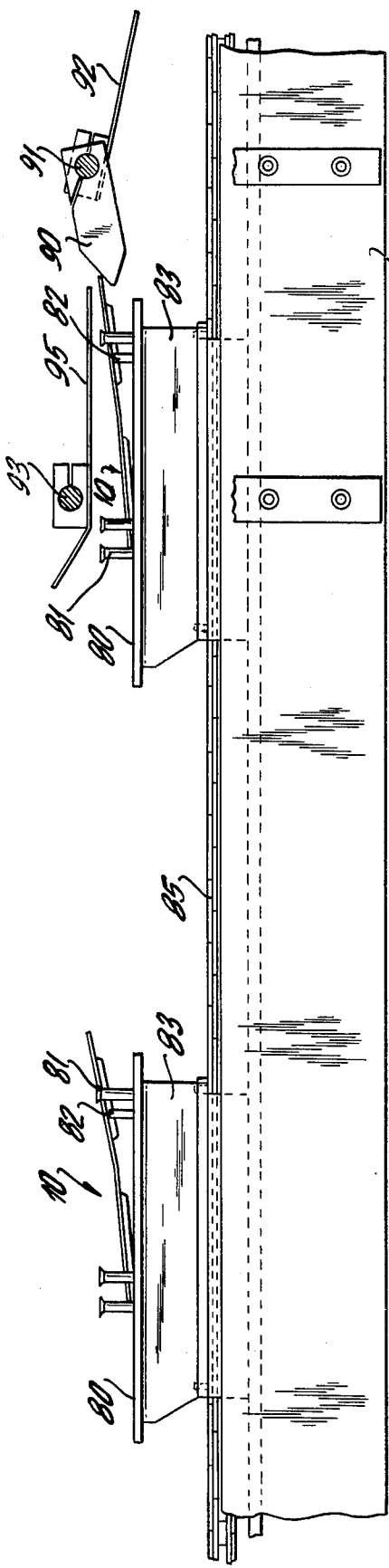
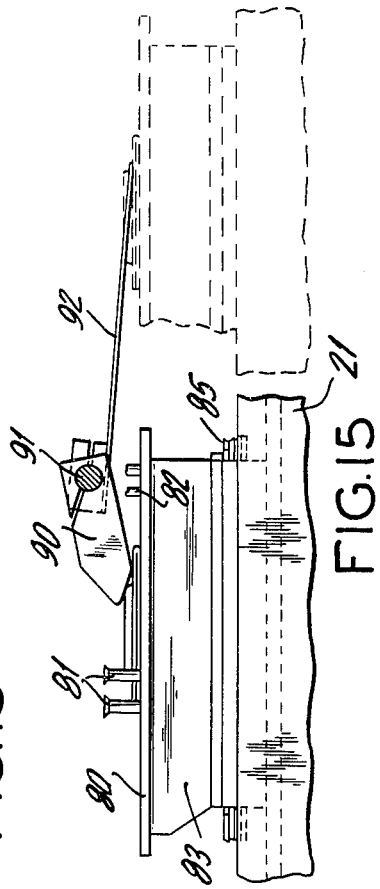
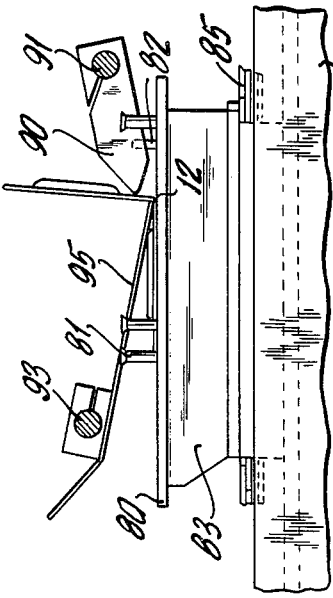
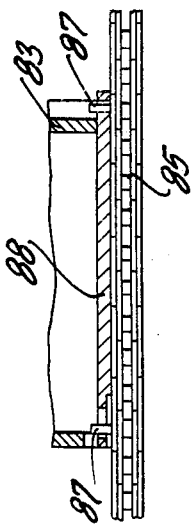

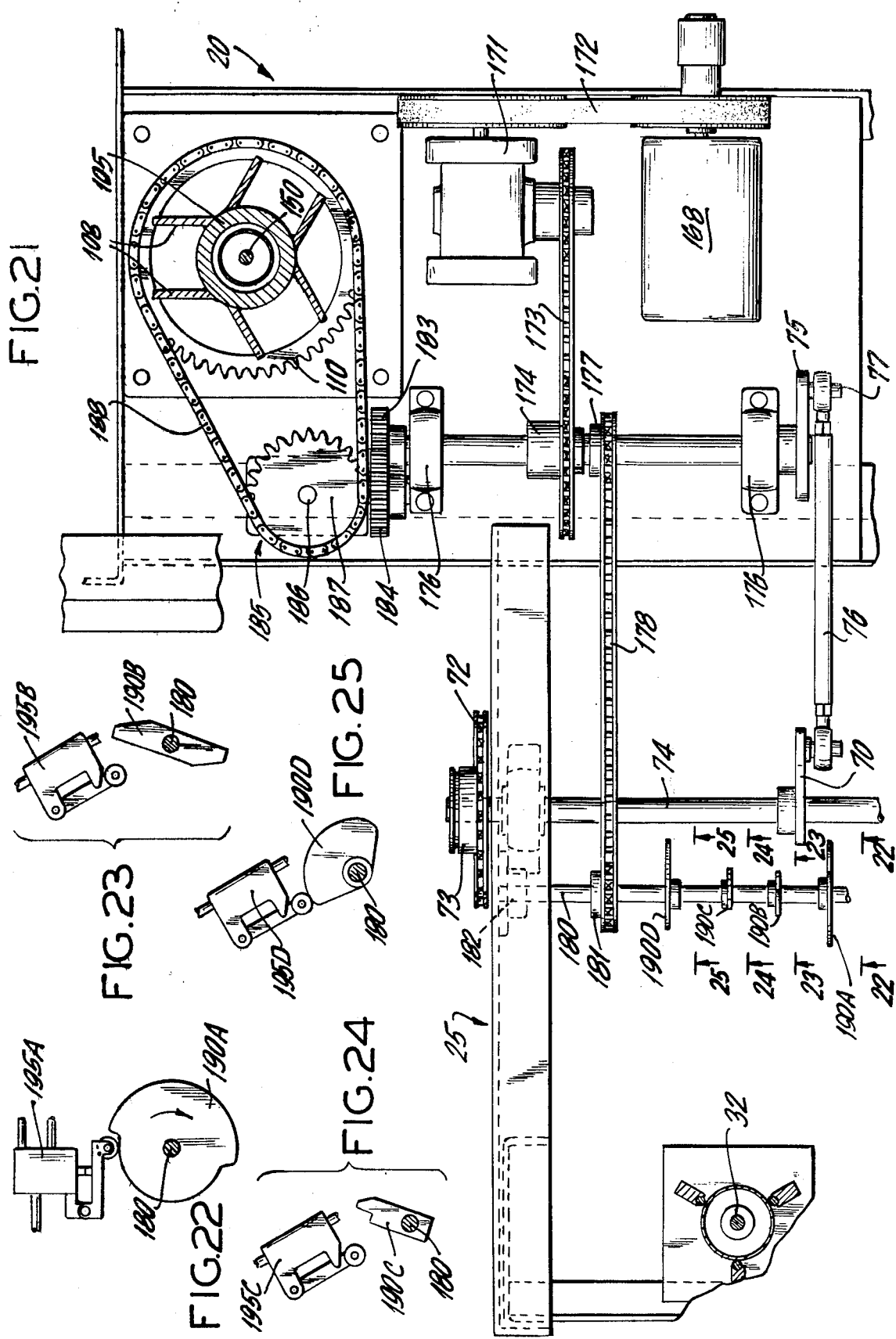

METHOD FOR FORMING ARTICLE-HOLDING DISPLAY PACKAGES

This is a continuation, of application Ser. No. 437,314, filed Jan. 28, 1974, now abandoned, which is a division of application Ser. No. 205,817, filed Dec. 8, 1971, now U.S. Pat. No. 3,788,032.

FIELD OF THE INVENTION

This invention relates to the formation and sealing of article-holding pockets in plastic windows of foldable paperboard blanks and, more particularly, to a novel, simplified, and more efficient method for this purpose.

BACKGROUND OF THE INVENTION

It is known to seal articles in pockets which are formed and sealed in plastic windows of paperboard blanks. These blanks have one or more openings which are covered, on one surface, by a heat-deformable and heat-sealable plastic sheet. The pockets are formed by heating the plastic material extending across the windows and deforming this plastic material to form a pocket. After the article is placed in the pocket, the pocket is closed, for example by folding the blank about a fold line and then heat sealing the plastic material. As the plastic sheet or film which is used is generally transparent, the article is provided in a decorative package in which it is sealed but nevertheless is fully visible.

However, while the known packaging machines for thus packaging articles in transparent pockets in a paperboard blank provide a satisfactory product, there has been a demand for a packaging apparatus, for forming such a product, which will be more efficient and have a much higher output per unit of time than machines and methods presently available.

SUMMARY OF THE INVENTION

In accordance with the invention, a packaging machine is provided which is faster and more dependable than known packaging machines for forming and sealing article-holding pockets in plastic windows of folded paperboard blanks having window openings covered on one surface of the blanks by a heat-deformable and heat-sealable plastic sheet. While the invention apparatus utilizes dielectric sealing, it effects continuous dielectric sealing with multiple electrodes. Thus, the invention apparatus is at least twice as fast, or even faster, than known apparatus of the same general class. For example, the production rate of the invention machine is at least 30 cycles per minute, as compared to known machines, of the same general class, which have a production rate of 10 to 12 cycles per minute.

The method of the invention involves novel method steps which also result in a greatly increased output per unit of time. The paperboard blank, in a starting state, is essentially a two-part blank having a median fold line therein, and is formed with at least one pair of window openings, with the window openings of each pair being disposed symmetrically on opposite sides of the fold line. That part of the blank which has the window openings or apertures therein, and which constitutes about one-half of the total blank area, has a sheet of heat-deformable and heat-sealable plastic sealed to one surface. In practicing the method, the blank, having the sheet of plastic sealed thereto, is heated while it is being transported to a station where a pocket is drawn in the heated plastic. After this, an article is placed in the formed pocket at a further station, following which the machine folds the card over on itself so that the two halves are superposed with their plastic sheet coverings in superposed relation. The card is then passed to another station where the card is dielectrically heat sealed so that the article is completely enclosed in heat sealed plastic and mounted in the card or blank. The completed card then moves to an ejection station or the like where it can be fed to a conveyor, be packaged, or be subjected to whatever further processing may be necessary or desirable.

The apparatus includes a turret mounted for rotation about an upright axis and containing two or more heat sealing devices which are moved to and from work-engaging positions by fluid pressure actuators whose operation is controlled by valves operated by suitable cams. As each heat-sealer moves into its operative position, it is automatically energized from a dielectric generator. The heat sealers serve to seal the folded over blanks to each other to enclose the article in a pocket, with the article being sealed in the pocket. The turret is rotated by suitable drive mechanisms including a chain trained around a sprocket secured to rotate with the turret.

An endless chain conveyor extends from the turret and is trained around a sprocket rotatable with the turret, at one end, and around a return sprocket spaced some distance from the turret. This endless chain conveyor has two parallel runs or strands. Blank support tables are removably positioned on the endless chain conveyor to receive pre-formed blanks and to deliver these pre-formed blanks to the heat-sealing means of the turret.

A blank forming line extends laterally from one run of the endless chain and has, at its outer end, a support table carrying a stack of the paperboard blanks formed with the windows and having a sheet of heat-deformable and heat-sealable plastic sealed to one surface and covering the windows. At equal spacings from the table and from each other, there are a dwell station, a molding or pocket forming station, and a discharge station which is at the run of the endless chain conveyor. A carrier is oscillatable in a vertical plane extending through the center line of the path of travel from the support table to the discharge station. This carrier is suspended by a pair of links and is oscillatable between two end positions. The carrier is provided with vacuum pick-up means, which are capable of being supplied with air under pressure for releasing an article. In one end position, one pick-up means on the carrier picks the top blank from the support table, an intermediate pick-up means picks up and heats a blank at the dwell station and a third or other end pick-up means picks up a heated and formed blank at the molding or pocket forming station. In the other end position, the first pick-up means transfers the blank picked up from the support table to the dwell station, the intermediate pick-up means positions the heated blank at the molding or pocket forming station, and third pick-up means discharges a formed blank onto a support table on the endless chain conveyor.

The formed blank is then moved along by the endless chain conveyor and an article may be dropped into the already formed pocket therein at any point. As the formed blank moves onto the other parallel run of the endless chain conveyor, folding means cooperate with the blank to fold the blank about its median fold line and to retain the blank in folded condition. The thus folded blank is then moved into operative relation with one heat-sealing means on the turret and, during continued rotation of the turret, is heat-sealed to sealingly enclose the article in a plastic pocket. After leaving the heat-sealing turret, the completed packaged article is dropped onto an endless belt conveyor extending substantially centrally and longitudinally of the device between the two parallel runs of the endless chain conveyor.

Mechanical interconnections are provided between the carrier for the pick-up means, the turret, the heat-sealing means, and other elements so that all elements of the machine operate in synchronized relation. Due to the multiple dielectric sealing heads on the turret, which are continuously operated, the output of the apparatus per unit of the time is very substantially increased. As stated, the output is of the order of 30 cycles per minute or better, as compared to an output of 10 to 12 cycles per minute of known apparatus of the same general class or type.

An object of the invention is to provide an improved method for forming and sealing article-holding pockets in plastic windows in paperboard blanks having window openings covered, on one surface of the blanks, by a heat-deformable and heat-sealable plastic sheet.

A further object of the invention is to provide such a method which is characterized by an output, per unit of time, which is very substantially in excess of the output, per unit of time, of known methods and apparatus for performing essentially the same operation.

Another object of the invention is to provide such a method utilizing continuously operable heat-sealing means.

For an understanding of the principles of the invention, reference is made to the following description of typical embodiments thereof as illustrated in the accompanying drawing.

BRIEF DESCRIPTION OF THE DRAWING

In the drawing:

FIG. 1 is a side elevation view of one form of packaging apparatus embodying the invention;

FIG. 2 is a perspective view of the paperboard blank in its initial condition;

FIG. 3 is a perspective view of the completed article;

FIG. 7 is an enlarged vertical sectional view of a blank positioned on a resilient pad at the dwell station;

FIG. 8 is an enlarged vertical sectional view showing a heated die holding the blank in position over the mold at a molding station;

FIG. 9 is a still further enlarged vertical sectional view of the heated die member illustrating the vacuum connection for holding and carrying a blank;

FIG. 10 is a view taken on the line 10—10 of FIG. 9;

FIG. 11 is an enlarged vertical sectional view of the female die illustrating its vacuum connection and the actual formation of a pocket;

FIG. 12 is a view taken on the line 12—12 of FIG. 11;

FIG. 13 is an enlarged partial side elevation view, corresponding to FIG. 1, illustrating support tables on one of the runs of the conveyor and moving toward the blank folding mechanism;

FIG. 14 is a similar view illustrating a phase of the folding operation;

FIG. 15 is a similar view illustrating the final phase of the folding operation;

FIG. 16 is a vertical sectional view on the line 16—16 of FIG. 6, illustrating the removable connection of a support table to the endless conveyor;

FIG. 21 is a horizontal sectional view taken along the line 21—of FIG. 1 and illustrating the drive mechanism of the apparatus;

FIGS. 22, 23, 24 and 25 are views taken along the correspondingly numbered lines of FIG. 21 and illustrating respective cams of the apparatus;

DESCRIPTION OF THE PREFERRED EMBODIMENTS

Figure 4:
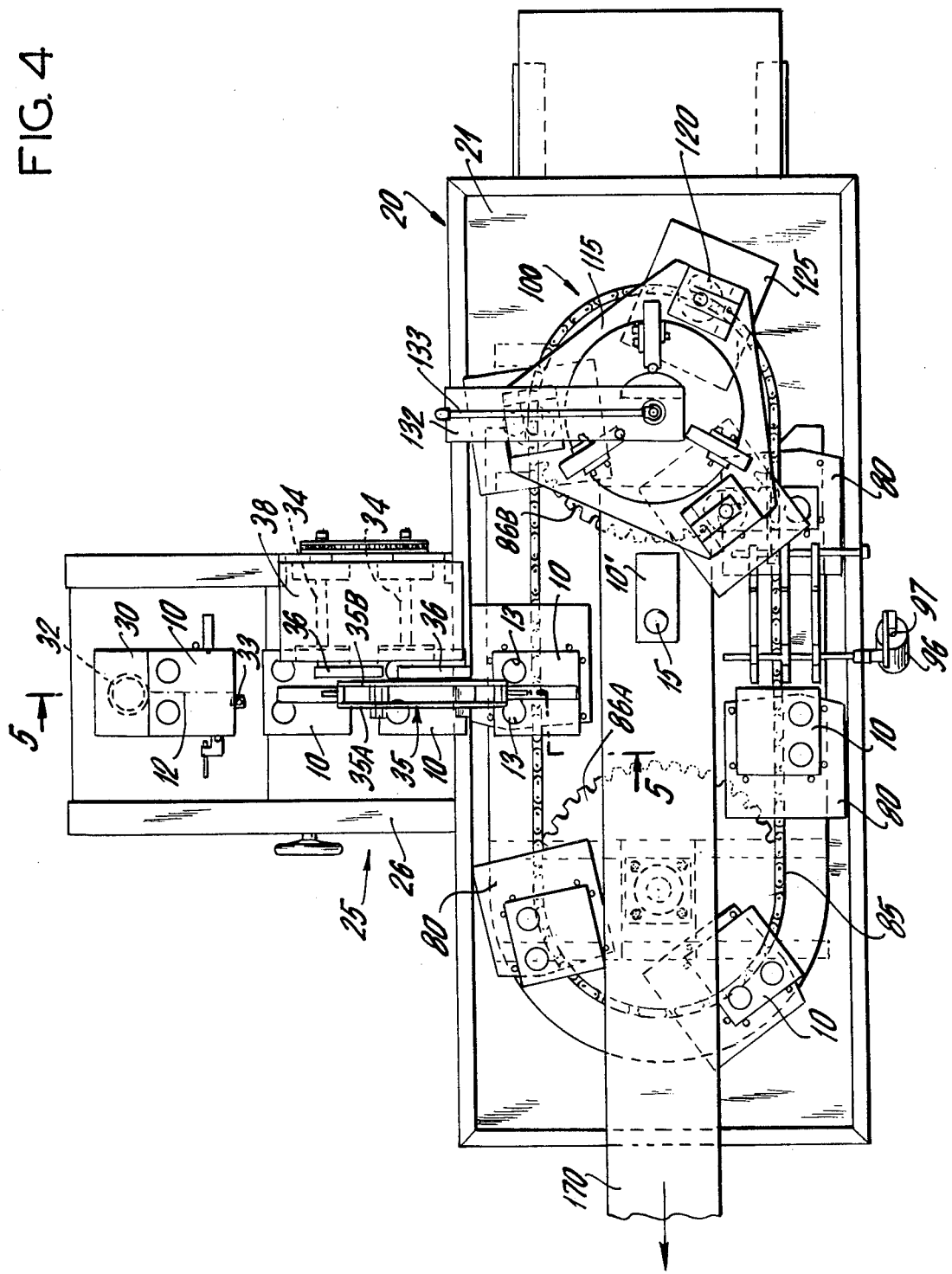
FIG. 4 is a top plan view of the apparatus, corresponding to FIG. 1.

Referring to FIGS. 1 through 4 of the drawing, the apparatus embodying the invention, and which is generally illustrated, in elevation, in FIG. 1 and, in plan, in FIG. 4, is arranged to form substantially flat blanks 10, such as shown in FIG. 2, into display packages 10', such as shown in FIG. 3. Each blank 1 includes a sheet of paperboard 11 having a median fold line 12 and formed with pairs of apertures 13, preferably circular in form, with the respective apertures of each pair being disposed on opposite sides of fold line 12 and at substantially equal distances therefrom. At least that portion of paperboard base 11 formed with the apertures 13 has a sheet 14 of heat-deformable and heat-sealable plastic sealed thereto, as by heat sealing. In the operation of the machine, the plastic windows covering the apertures 13 are heated and then deformed to form pockets, after which articles are placed in these pockets and the blank 10 is folded about its median fold line 12 to enclose the articles. Finally, the folded blank, particularly that portion having the pockets therein, is heat-sealed to form the pockets 15, each containing an article to be displayed, as shown in FIG. 3. While the apertures 13 are illustrated as circular, they can be any desired shape in accordance with the shape of the article to be enclosed in the resultant plastic window pockets 15, and the articles may be either contained loosely in the sealed plastic window pockets or may be conformingly retained therein by heat-sealing the plastic material around the articles.

The apparatus comprises a main frame, generally indicated at 20, which supports the blank folding means, the heat sealing means, a discharge conveyor, and the drive means of the apparatus. A side frame 25 extends laterally from main frame 20, so that the apparatus, in plan, has a generally T-shape, and side frame 25 carries means supporting a stack of blanks 10, as well as supporting a dwell station, molding station and transfer means for picking blanks 10 from the stack and moving them successively to the dwell station, to the molding station and to a discharge station on the main frame 20.

Main frame 20 includes a generally horizontal upper member 21, which may be termed a table, supported by legs 22, and includes an intermediate horizontal member 23 which supports the driving means for the apparatus. Side frame 25 has an upper generally horizontal element 26 supporting a dwell station and a molding station, member 26 being supported by generally upright legs such as 27. For a purpose to be described, a framework 28, forming part of the side frame 25, extends above the member 26. The frame 25 is illustrated in considerable detail in FIGS. 4, 5 and 6. At the outer end of frame 25, or to the left thereof as viewed in FIGS. 5 and 6, a shelf 31 supported on legs 27 serves as a support for a blank support table 30 on which there is arranged a stack of blanks 10. Table 30, whose height is adjustable by means of a fluid pressure actuator generally indicated at 32, is guided for vertical adjustment by a guide generally indicated at 33 and cooperating, in its guiding function, with the actuator 32. Table 30 constantly supplies a stack of blanks 10 at a constant level, and air jet means, described more fully hereinafter, direct a separation air jet at the stack of blanks at the proper moment to separate the top blank from the next lower so that the top blank may be picked up. Fluid pressure actuator 32 is controlled by a sensing means to maintain table 30 at the proper height.

Referring more particularly to FIGS. 5 through 12, the blanks 10 are picked up from the stack on table 30, transferred to a dwell station, then transferred to a molding station, and then discharged by transfer means including a carrier 35 comprising a pair of generally trapezoidal centrally apertured vertically oriented plates 35A and 35B. At its opposite upper corners, carrier 35 is pivotally connected to the free ends of respective links 36 whose opposite ends are secured to respective shafts 34 oscillatably mounted in respective bearings 37 secured to the undersurface of the upper horizontal element 38 of framework 28, the arrangement being such that carrier 35 is spaced laterally from upper element 38, as will be seen in FIG. 4. Carrier 35 is arranged to be oscillated from the position shown in FIG. 5 to that shown in FIG. 6, by oscillation of links 36. In moving from the position shown in FIG. 5 to that shown in FIG. 6, links 36 are pivoted clockwise to swing upwardly and to the right, as viewed in FIG. 5, and upon return from the position shown in FIG. 6 to that shown in FIG. 5, links 36 are pivoted upwrdly and counterclockwise to the position shown in FIG. 5. The arrangement constitutes a parallel motion linkage, so that carrier 35 is always maintained with its lower edge substantially horizontal.

Respective pick-up devices 40A and 40B are secured to the opposite lower corners of carrier 35, each pick-up device including a bracket 41, welded or otherwise secured to carrier 35, and a substantially horizontal plate 42 welded or otherwise secured to a respective bracket 41. Each plate 41 carries a plurality of vacuum cups 43A, 43B which may be connected either to a source of vacuum or to a source of air under pressure.

Intermediate the length of carrier 35, a bracket 44 secured to its lower edge supports a combination heater, male die and pick-up element generally indicated at 45 and shown more clearly in FIGS. 7, 8, 9 and 10. Heater element 45 includes a substantially horizontal plate 46 secured to bracket 44 and connected by legs 47 to a lower plate 48. A vacuum cup 51 is secured to upper plate 46 and extends downwardly through a notch in the end of plate 48 so that its vacuum cup portion is positioned below plate 48. Vacuum cup 51 is arranged to be selectively connected to a source of vacuum or to a source of air under pressure.

An electrically energized heater 50 is mounted in heat conducting relation on plate 48 substantially centrally with respect to a pair of male dies 55, there being as many pairs of male dies 55 as there are transparent plastic pockets to be formed in a blank 10. As best seen in FIGS. 9 and 10, each male die has a circular configuration corresponding to the circular configuration of a pocket in blank 10, and is generally H-shape in cross section including an annular rim 52 and a circular web 53 formed with a series, such as four, of apertures 54 arranged at equiangular spacings. Web 53 is spaced from plate 48 to define a vacuum chamber 56, as shown in FIG. 9, and with each vacuum chamber 56 communicating with a conduit 57 which may be selectively connected either to a source of vacuum or to a source of air under pressure. Conduit 57 has as many branches extending through apertures in plate 48 as there are male dies 55. The vacuum supplied through conduit 57, in cooperation with the vacuum supplied to cups 51, serves to maintain a blank 10 in engagement with the combination heater and die element 45.

It should be noted that the elements 40A, 45 and 40B have equal center to center spacings from each other, and these center to center spacings are equal to the center to center spacings of a dwell station, a female mold, and a discharge station on the main frame 20. The dwell station 60 is adjacent blank supply table 30, and comprises a plate 61 adjustably supported by threaded legs 62, a layer of rubber 63 being secured to the upper surface of plate 61, as best seen in FIG. 7.

Following dwell station 60 there is a mold station at which there is a female mold 65 best seen in FIGS. 5, 6, 11 and 12. Female mold 65 has a mold cavity 64 conforming to the shape of the plastic pocket to be formed in blank 10. For the purpose of drawing the heated plastic film 14 into mold cavity 64 to form the pocket 15, mold cavity 64 has its generally flat bottom surface formed with intersecting channels or grooves 66 which communicate, at their intersection, with a bore 67 which may be selectively connected to a source of vacuum, bore 67 extending from cavity 64 through the female mold 65. In forming the pocket 15, each female mold cavity 64 cooperates with a respective male die 55 which has already imparted a relatively shallow concave shape to the plastic film 14 at each of the apertures 13. However, the actual completion of the formation of each pocket 15 is effected by supplying vacuum through line 67 to the interior of mold cavity 66 to draw the heated plastic into the mold cavity 64 so that the plastic assumes the shape of the mold cavity 64. The end result of this operation is indicated more particularly in FIG. 11.

As stated, carrier 35 is oscillatable between a first position, shown in FIG. 5, at which pick-up element 40A is at table 30, heater element 45 is at dwell station 60 and pick-up element 40B is at the female mold 65, to a second position, shown in FIG. 6, in which pick-up element 40A is at dwell station 60, heater element 45 is at female mold 65, and pick-up element 40B is at the discharge station, which latter is described more fully hereinafter. To effect this oscillatory movement of carrier 35, with the carrier maintaining a constant horizontal orientation, respective sprockets 71 are secured to shafts 34 and are engaged with an endless chain 72 whose lower end is engaged with a relatively large sprocket 73. Sprocket 73 is secured to a shaft 74 which is oscillated by means of a crank arm 70 secured thereto and having its outer end pivotally connected to a connecting link 76 whose opposite end is pivotally secured to an eccentric pin 77 on a crank 75 secured to rotate with a shaft 78. As crank 75 rotates, it oscillates sprocket 73 through link 76 and crank arm 70 to oscillate carrier 35 between its two extreme positions.

The discharge, or blank-deposit, stations are constituted by support tables 80 removeably mounted at spaced intervals on an endless chain 85 trained around sprockets 86A and 86B adjacent opposite ends of main frame table 21. Sprockets 86A and 86B are rotatable about substantially vertical axes, and sprocket 86B is driven in a manner described hereinafter, with sprocket 86A being driven from sprocket 86B by chain 85.

As best seen in FIGS. 5, 6 and 12 through 15, support tables 80 have pins 81 projecting from their upper surfaces and arranged to properly position a blank 10 on the support table, the particular layout, in plan, of pins 81 depending on the particular configuration of blanks 10. For a purpose to be described, each support plate 80 is further provided, adjacent its leading edge in the direction of travel of chain 85, with additional pins 82 whose height is somewhat less than the height of pins 81, which are headed at their upper ends. For ready reference, the additional pins 82 will be hereinafter referred to as the deflecting pins. Support tables 80 comprise substantially flat metal plates which are releasably secured by screws to the upper peripheral edges of rectangular buckets 83, so that support tables 80 are elevated above the level of chain 85. Within the area defined by the locating pins 81, each support plate has an aperture 84 to receive the pockets 15 on the blanks 10, so that these pockets project downwardly into the associated bucket 83. The buckets are made sufficiently deep to accommodate all depths of pockets 15.

Support plates 80 may be readily interchanged to handle blanks of different shapes and with different dimensions of pockets, by simply removing the holding screws and placing another support plate on a bucket 83. In addition, the entire assembly including the support table 80 and the bucket 83 is readily removable from chain 85 as illustrated in FIG. 16. From FIG. 16, it will be noted that, at intervals therealong, chain 85 is provided with upwardly projecting spaced pins 87, one of which projects into a mating aperture in the base 88 of a bucket 83 and the other of which projects into a slot in the base 88 of the bucket. Thus, the assemblies can be readily removed by merely lifting the tables 80 secured by screws to the buckets 83, such removal of the buckets themselves, however, being necessary only for inspection, maintenance or repair.

The blanks 10, having the pockets 15 formed therein, are deposited by carrier 35 on the support tables 80, and travel to the left, as viewed in FIG. 4, with the tables moving around the sprocket 86A, and spaced at regular intervals along chain 85. In the opposite straight run of chain 85, the blanks 10 carried by the support tables 80 are folded about the median fold lines 12. This operation is illustrated more particularly in FIGS. 13, 14 and 15. Referring to FIG. 13, a blank 10 deposited on a support table 80 is positioned by the locating pins 81, but its forward or leading edge rests on the deflecting pins 82 so that the blank is arched somewhat upwardly. As each support table 80, having a thus upwardly arched blank 10 mounted thereon, moves along the straight run of chain 85 from the position shown at the left in FIG. 13 to the position shown at the right, cam fingers 90, secured to an oscillatable shaft 91 to which is also secured a spring finger 92 projecting from shaft 91 in a direction nearly opposite to the direction of projection of cam fingers 90. The three cam fingers 90 slide beneath the undersurface of blank 10.

Referring to FIG. 14, at a position upstream or in advance of the cam fingers 90 there are three hold-down fingers 95, which are spring fingers secured to oscillate with a shaft 93. Shaft 93 has secured thereto, as best seen in FIG. 1, an arm 94 whose free end is articulated to the outer end of the piston rod 97 of a pneumatic actuator 96. The piston of actuator 96 is spring biased upwardly to move arm 94 to the position shown in FIG. 1, and the piston is moved downwardly by air pressure. When air is supplied to the piston of actuator 96, piston rod 97 is retracted downwardly and arm 94 is pivoted clockwise. This causes the spring hold-down fingers 95 to engage blank 10 with wheir free edges engaging the blank at the median fold line 12. This position is shown in FIG. 14. As the support table 80 continues to move to the right, as shown in FIGS. 14 and 15, cam fingers 90 fold the blank 10 about the median fold line 12, with the blank 10 being held by the holddown fingers 95 at this median fold line, so that the cam fingers 90 now ride on the outer surface of the folded blank 10, as viewed in FIG. 15. Immediately after the position shown in FIG. 14 is reached, air pressure is released from acutator 96 so that fingers 95 are swung upwardly out of action. The cam fingers 90 now hold the blank 10 in folded condition on support table 80, as viewed in FIG. 15 and, as the support table 80 continues to move to the right, the spring finger 92 secured to shaft 91 engages the folded blank and maintains the blank folded as the blank is transported to the heat sealing turret 100 which is concentric with the sprocket 86B.

Figure 5:
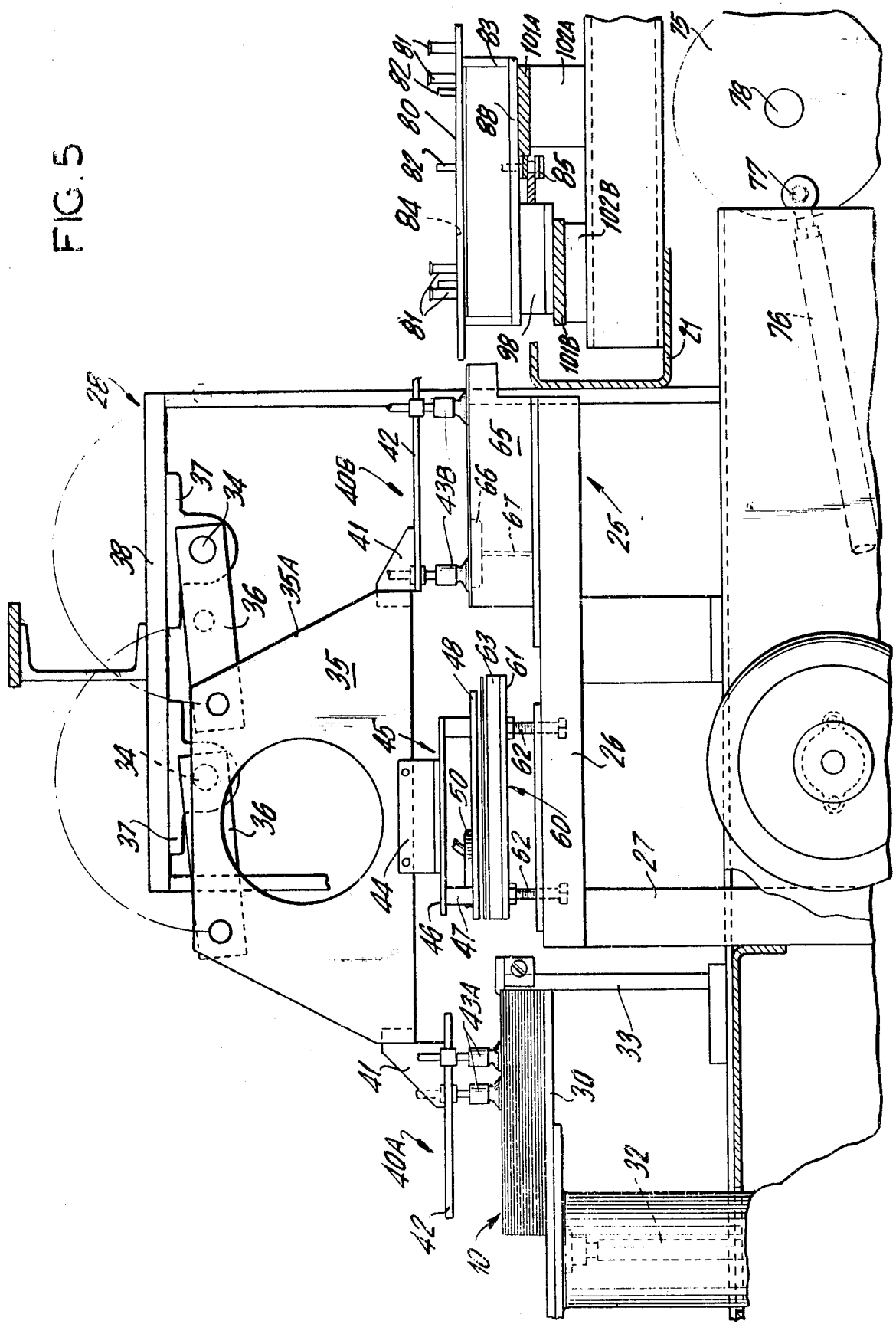
FIG. 5 is a transverse sectional view taken on the line 5—5 of FIG. 4.
Figure 6:
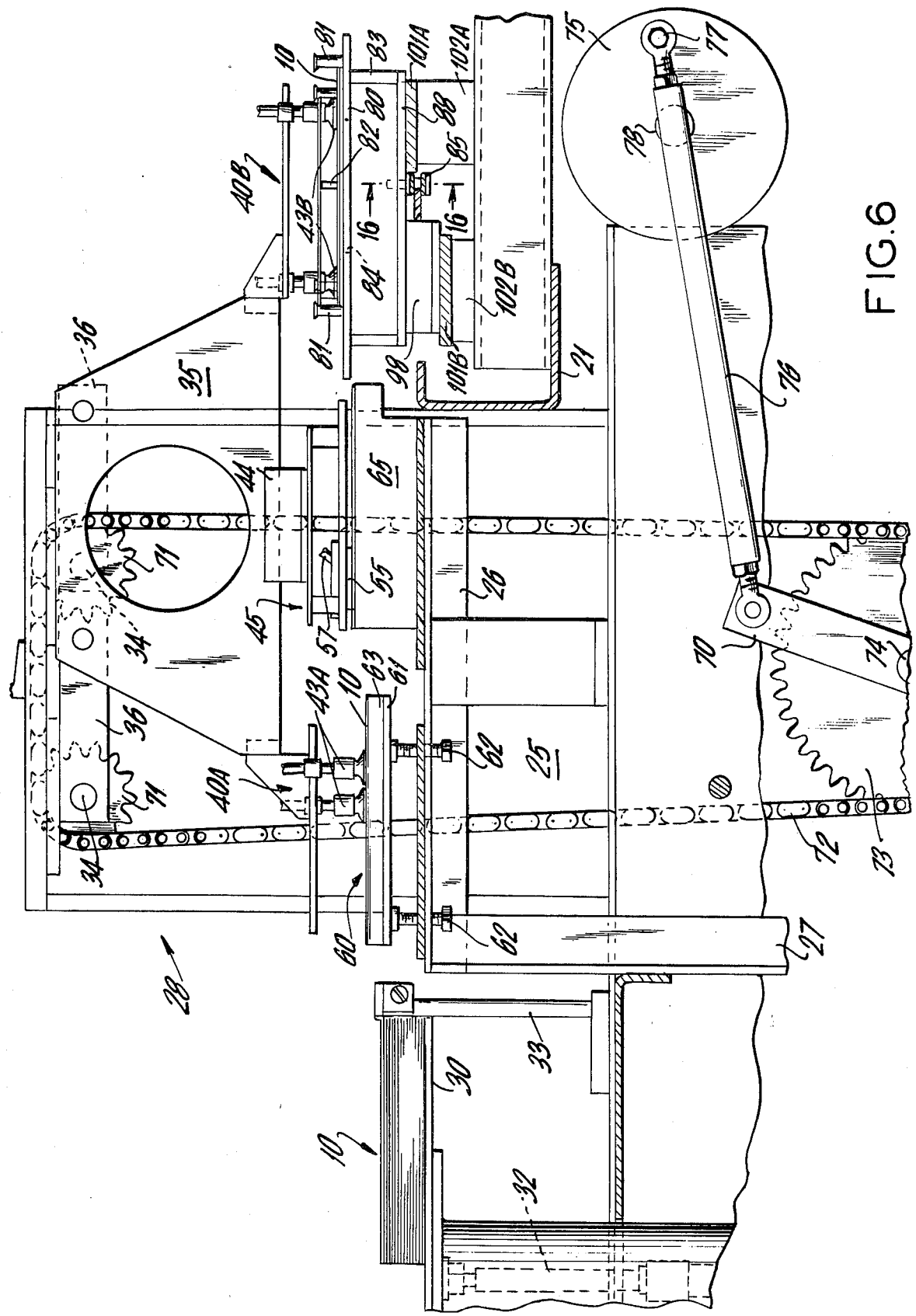
FIG. 6 is a view, similar to FIG. 5, but illustrating a carrier in a different position.

From FIGS. 5 and 6, it will be noted that each bucket 83, adjacent its normally outer edge, is provided with a depending support leg or guide 98 having a flat lower surface. During passage along the straight runs of conveyor chain 85, bottom wall or base 88 and depending guide 98 of each bucket 83 engage respective brass rails 101A and 101B mounted on respective supports 102A and 102B. The brass rails 101 provided for easy sliding movement of the buckets when traveling along the straight runs of conveyor chain 85. As the support tables 80 enter the range of sprocket 86B and heat sealing turret 100, the support tables are supported very accurately and steadily on a flat annular turret shelf 103 to which sprocket 86B is bolted or otherwise secured. At the heat sealing turret, base 88 engages a flat arcuate brass rail 104A secured to the upper surface of sprocket 86B, and guide 98 engages a flat arcuate brass rail 104B secured directly to shelf 103. The rails 104A and 104B provide for easy sliding movement of the buckets 83 as these tends to oscillate in a horizontal plane while passing around sprocket 86B and around heat sealing turret 100. This is particularly important when the heat sealing dies are pressed downwardly against the folded blanks 10 on the support tables and, to insure accurate horizontal orientation of each support table, the brass rails 104 may be shimmed so as to provide a perfectly level support surface for the buckets 83.

Figure 19:
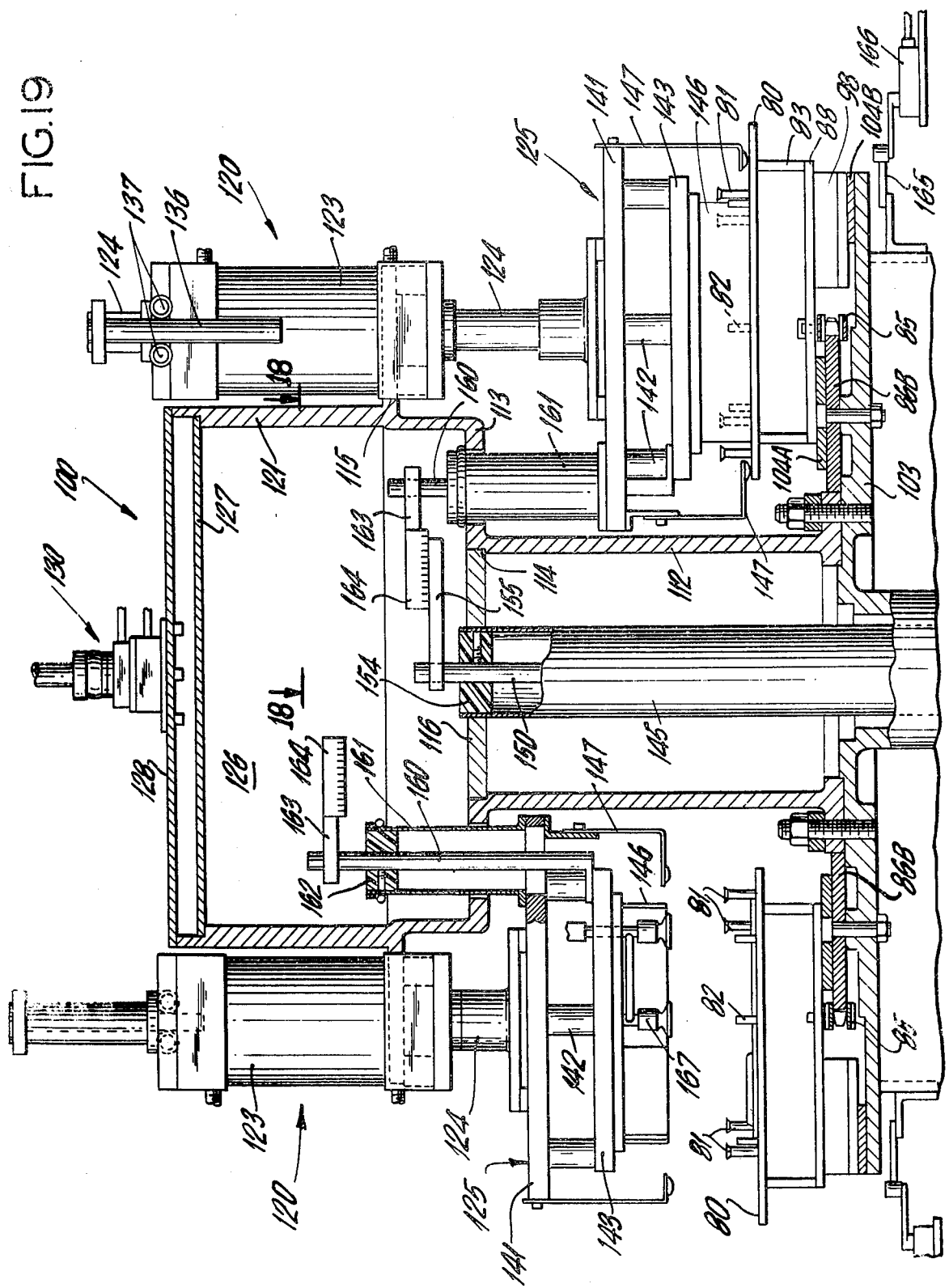
FIGS. 19 and 19a, when combined one above the other, constitute a vertical sectional view on the line 19—19 of FIG. 17.
Figures 19A, 20:
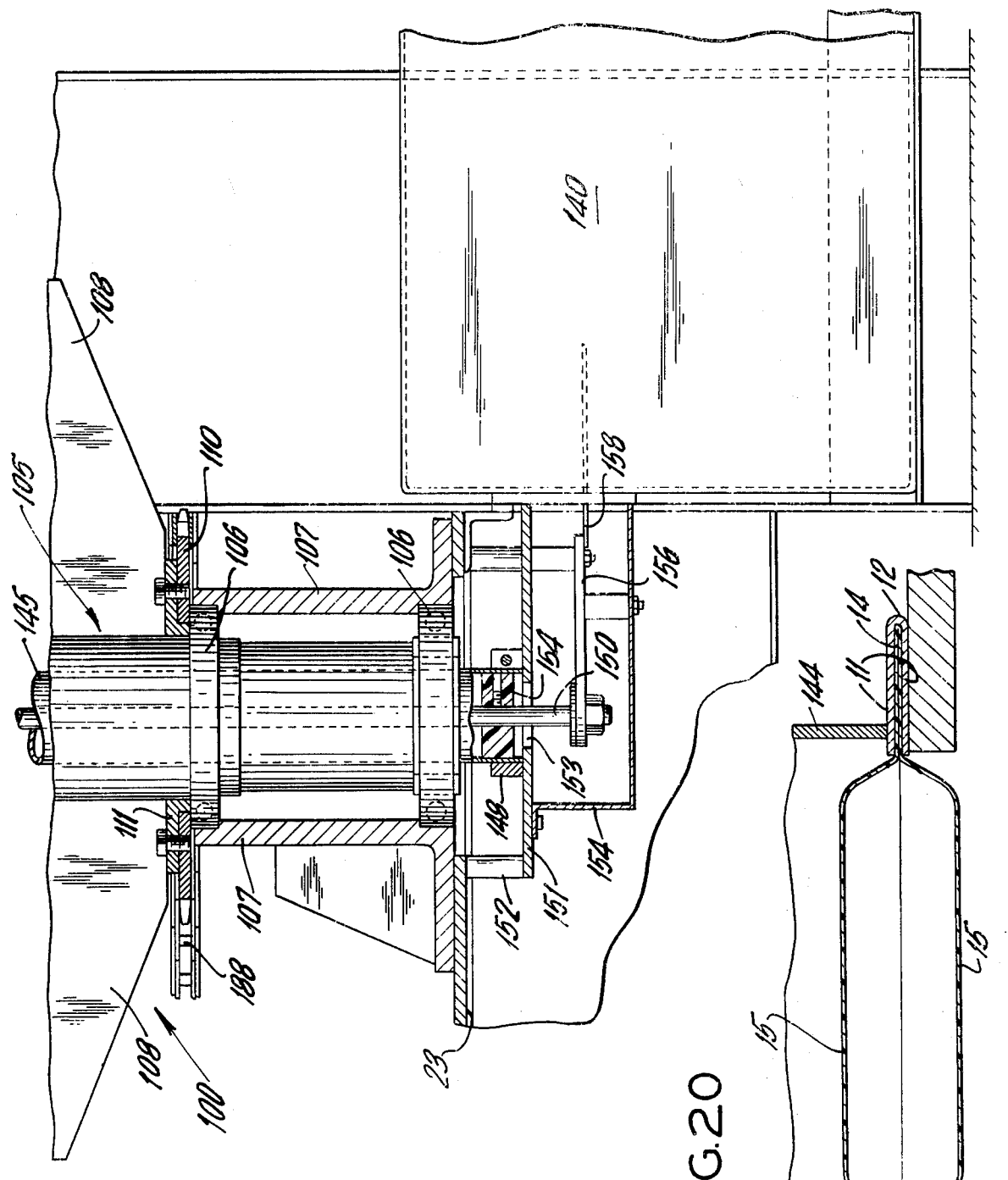
FIG. 20 is an enlarged vertical sectional view illustrating the sealing operation being performed by dielectric sealing electrodes.

Shelf 103 is formed as a flange on the upper end of a tubular central member 105 which is rotatably supported at its lower end in axially spaced bearings 106 in a tubular column 107 supported on lower shelf 23 of main frame 20. The shelf is reinforced by trapezoidal flanges 108 which are arranged in pairs to extend from central member 105, the pairs of webs being arranged in equiangular relation to each other, as best seen in FIG. 21. Just above the upper end of tubular column 107, a sprocket 110 is secured to an L-shaped flange 111 on member 105, as best seen in FIG. 19a.

A second tubular member 112, somewhat larger in diameter than tubular member 105, is bolted to turret shelf 103 to extend upwardly therefrom coaxially with tubular member 105. An enlarged diameter flat cup-shaped portion 113 is formed on the upper end of member 112, and member 112 has a shoulder 114 at its juncture with portion 113 and which seats an annular plate 116. The upper end of cup-shaped member 113 has an outwardly projecting hexagonal flange or shelf 115 having three relatively short edges 117 and three relatively long edges 118. In inwardly spaced substantially parallel relation with each shorter edge 117, a wall 121 extends upwardly from shelf 115, and walls 121 are interconnected by walls 122 each extending inwardly spaced parallel relation to a longer side 118. Adjacent each wall 121, flange or shelf 115 has an outwardly opening notch receiving the cylinder 123 of a respective pneumatic actuator 120 having a vertically oriented piston rod 124 to the lower end of which is secured a respective heat sealing die generally indicated at 125. The sealed enclosure 126, laterally defined by the walls 121 and 122, is closed at the top by a plate 127 seated in shoulders formed adjacent the upper edges of walls 121 and 122, and a circular plate 128 is disengageably secured to the upper edges of these walls in vertically spaced relation to the plates 127.

The supply of air to the actuators 120, and the exhaust of air therefrom, is effected through a rotary union 130 mounted on the plate 128 and connected to the actuators through respective cam actuated valves 131. An angular support arm 132 is secured to main frame 20, and extends across turret 100 at a distance above plate 128. Conduit means 133 extend along arm 132 and are connected, at the free end of the arm, to the rotary union 130. Arm 132, which is fixed against rotation, supports a fixed arcuate cam 135 which cooperates with respective actuators 134 at the inner end of each valve 131, cam 135 being angularly oriented and fixed so as to operate valves 131 in the correct sequence and for the correct period of time during the heat sealing operation. To maintain the proper angular orientation of the sealing dies 125 secured to pistons 124, each piston has connected thereto a guide rod 136 vertically reciprocable between spaced rollers 137 on the upper end of the associated cylinder 123. For this purpose, the piston rod 124 of each actuator 120 extends through both opposite ends of the associated cylinder 123.

The sealed enclosure 126 protects against radiation during heat sealing of the blanks, and each sealing die, when engaged with a folded blank 10, also forms a sealed enclosure therewith, to protect radiation. The electrical connections from a dielectric generator 140 to the sealing dies 125 are also sealed against radiation. These various means will now be described.

Each dielectric heater sealer comprises a support plate 141 secured to the lower ends of the associated piston rod 124 and supporting, through insulators 142, an electrically conductive plate 143 carrying heat sealing electrodes 144 engageable with the folded blank supported on a table 80, as best seen in FIG. 20. A sealing wall 146 depends from each electrically conductive plate 143 and completely encloses the electrodes connected thereto, this sealing wall having brush lower edges engageable with the support table 80 to form a sealed enclosure. Grounding is effected by spring fingers 147 which engage the support table 80 which is in electrical contact with the brass supports 104 in turn connected to the main frame 20.

Figure 18:
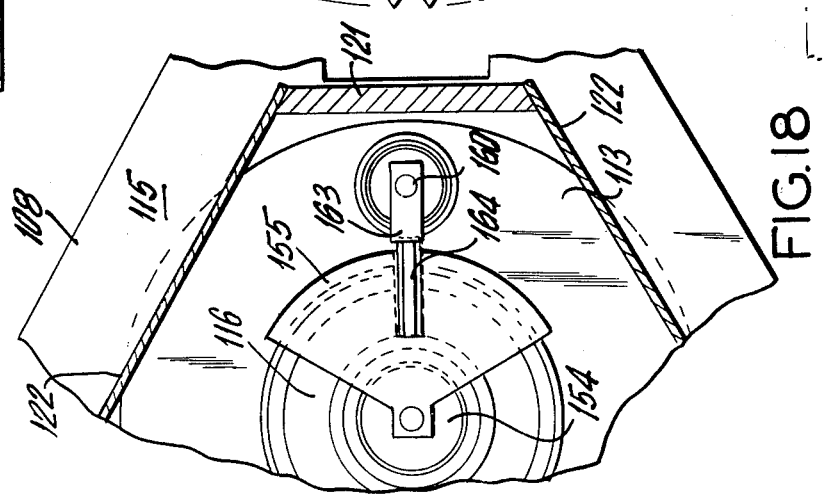
FIG. 18 is a partial sectional view taken on the line 18—18 of FIG. 19.

A tube 145 has its upper end secured in the opening in plate 115 and extends coaxially downwardly through tubular members 112 and 105 with its lower end secured by a clamp 148 to a plate 151 secured by suitable supports 152 to shelf 23 of main frame 20. The conductor tube 145 is aligned with an aperture 153 in plate 151, and the space beneath plate 151 is enclosed by a sealing enclosure 154 secured to dielectric generator 140. A main conductor 150 is mounted coaxially of tube 145 by means of upper and lower insulators 154. Main conductor 150 projects, at both ends, outwardly of the adjacent insulator 154. The lower end of conductor 150 is connected to a conductor strap or bus bar 156 supported on an insulator 157 and electrically connected to the output conductor 158 of dielectric generator 140. As shown more particularly in FIG. 18, the contact sector 155, of electrically conductive material, is secured to the upper end of main conductor 150, which is also of electrically conductive material.

Figure 17:
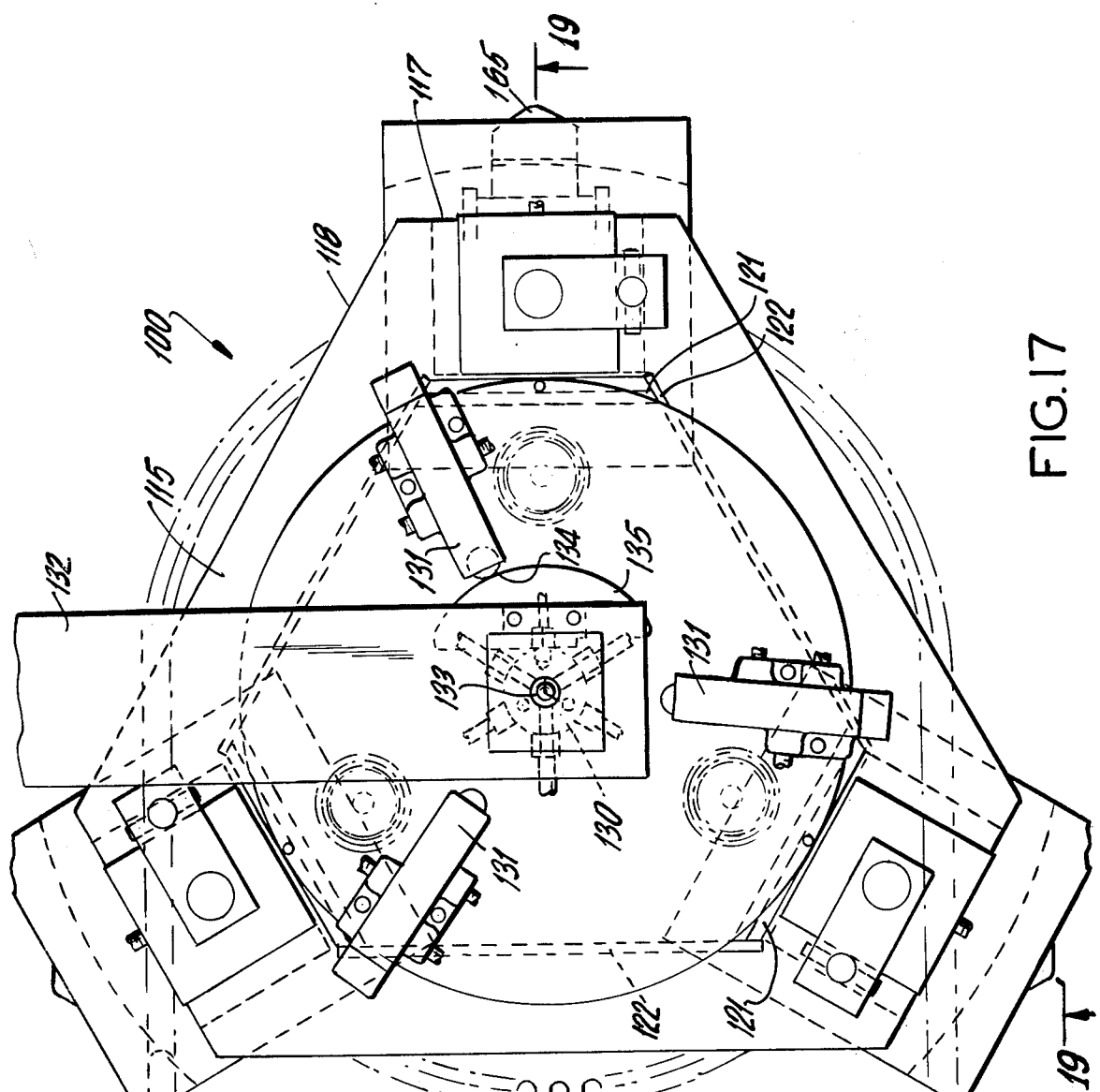
FIG. 17 is an enlarged plan view of the turret and heat sealing area, corresponding generally to the line 17—17 of FIG. 1.

Contact sector 155 serves to supply dielectric current from dielectric generator 140 to heat sealing dies 125 during the period when each heat sealing die is to effect a heat sealing of a folded blank. For this purpose, each heat sealing die has a relatively rigid conductor 160 electrically connected and secured at its lower end to the conductive plate 143. Each conductor 160 extends upwardly through a respective sealing tube 161 secured to the associated support plate 141 and extending upwardly through an aperture in the lower wall of cup 113. Each conductor 160 is supported in an insulator 162 in the upper end of its associated tube 161. An arm 163 is adjustably secured to the upper end of each conductor 160 to extend radially inwardly, and the radially inner end of each arm 163 carries a brush 164. As each heat sealing die 125 is lowered by its actuator 120 to the heat sealing position, as illustrated at the right in FIG. 19, its associated brush 164 engages contact sector 155 to energize the heat sealing electrodes 144. In order for such energization to occur, the respective heat sealing die 125 must be within the sector, considered in the direction of rotation of the heat sealing turret, in which heat sealing takes place, this sector being indicated by the dot and dash lines in FIG. 17, with the lower line being indicated "start of seal" and the upper line being indicated "end of seal". As a heat sealing unit enters this sector, the actuator 134 of the associated valve 131 engages the cam 135 to effect operation of the associated actuator 120 to lower the heat sealing die into the position shown at the right in FIG. 19. At the end of the sector, the associated brush 164 disengages contact sector 155 to disconnect dielectric generator 140 and, shortly thereafter, actuator 134 of the associated valve 131 disengages cam 135 so that actuator 120 is operated to lift the sealing die 125 to the position shown at the left in FIG. 19.

Each heat sealing unit is also provided with a switch cam 165 cooperable with a switch 166 to energize dielectric generator 140 as the heat sealing unit reaches the heat sealing zone. Plate 143 also carries vacuum pick-up cups 167 arranged to pick-up and transport a heat sealed blank 10 following the heat sealing operation and as the associated actuator 120 is moved to the upper position. The vacuum connected to cups 167 is released as each heat sealing unit reaches a position above an endless carrier 170, shown in FIGS. 1 and 4, to drop the heat sealed article 10' onto endless conveyor 170 for transport to a further station. Conveyor 170 is driven separately from the rest of the apparatus.

FIG. 21 illustrates the driving means of the apparatus, and FIGS. 22-25 illustrate the operation of various cams for controlling operation of the apparatus. FIG. 21 is a horizontal sectional view on the line 21—21 of FIG. 1. Referring to FIGS. 21, a motor 168 drives a right angle reduction gear 171 through a variable pulley and belt drive 172, and a chain 173 drivingly interconnects the output sprocket of reduction gear 171 to a sprocket 174 secured on a main shaft 175 rotatably supported in gearings 176 on frame 20. Crank 75, driving connecting rod or link 76, is secured to rotate with shaft 175 at one end thereof to oscillate the carrier 35 through oscillation of shaft 74. A second sprocket 177 secured to rotate with main shaft 175 is connected by a chain 178 to a sprocket 181 on a cam shaft 180, supported in bearings 182, of which only one is shown in FIG. 21.

A spur gear 183 on the other end of main drive shaft 175 meshes with an input spur gear 184 of a right angle gear box 185 having a vertically oriented output shaft 186 to which is secured a sprocket 187 connected by a chain 188 to sprocket 110 secured to rotatable member 105 of the heat sealing turret 100. All of the mechanism of the apparatus is driven from the described driving means, except discharge conveyor 170, which is separately and externally driven. At the left end of FIG. 21, there may be seen the guided support for the blank supply table 30.

Cams 190A-190D are secured to rotate with cam shaft 180 and operate various control valves 195A-195D, as shown in FIGS. 22-25. FIG. 22 illustrates cam 190A controlling operation of valve 195A which controls the connection of the source of vacuum to the mold and vacuum pick-ups of the transfer or carrier mechanism shown in FIGS. 5 and 6. Cam 190B, as shown in FIG. 23, operates a control valve 195B which controls the supply of air for the jet for separating the top blank 10, on support table 30, from the blank immediately beneath the top blank. As shown in FIG. 24, cam 190C operates a valve 195C for controlling the supply of air under pressure to the pick-up cups of the transfer mechanism. In FIG. 25, cam 190D is illustrated as operating a valve 195D which controls supply of air to the actuator 96 for operating the blank folding fingers 95. The interconnections of these valves in the air and vacuum circuits will be described more fully with reference to FIG. 28.

Figure 26:
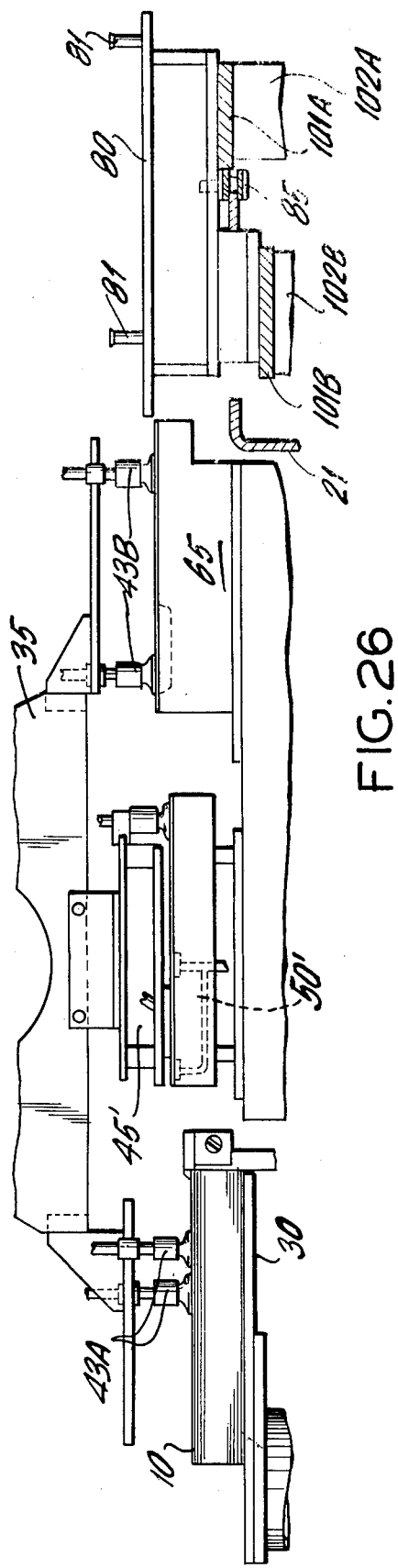
FIG. 26 is a partial side elevation view of a modified form of transfer mechanism.

FIG. 26 illustrates a modified form of transfer mechanism wherein the heating is effected at the second position, by a heater 50', during the interval a blank 10 is at this second station, the member 45' constituting, in this instance, only the male member of the mold and not including the heater. However, while an arrangement of this type works satisfactorily, it is nowheres near as efficient or satisfactory as the arrangement shown in FIGS. 1 through 25 and 28, wherein the blank is heated as it is being transported from the second station to the third station and while it is at both of these stations. In the arrangement shown in FIG. 26, heater 50' is stationary, and carrier 35 mounts an unheated male die having the same vacuum provisions as described in connection with FIGS. 5 through 10.

Figure 27:
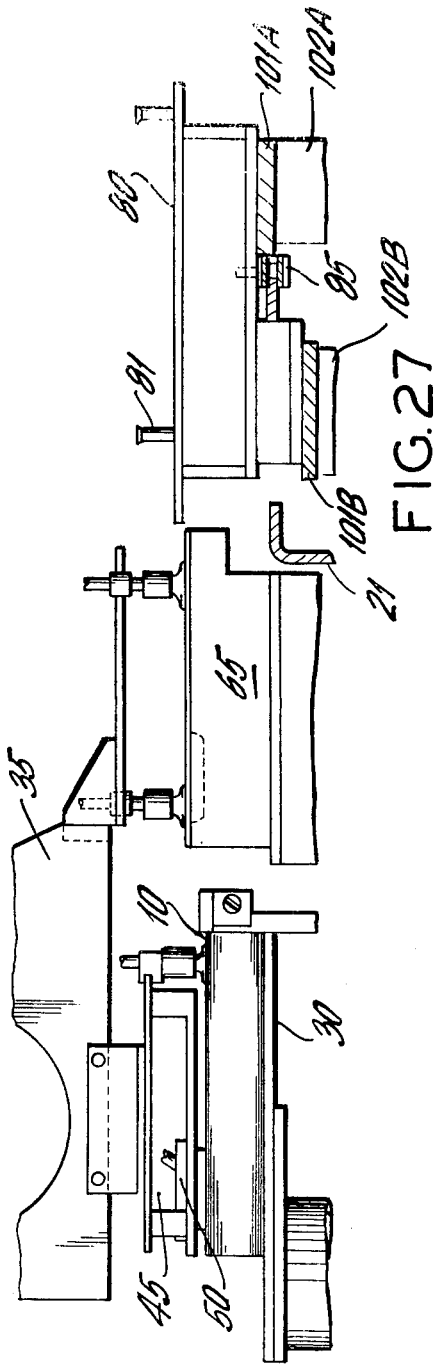
FIG. 27 is a view similar to FIG. 26 illustrating another modified form of the apparatus.

In the modified embodiment of the invention shown in FIG. 27, one transfer position is eliminated, and the heated male die member 45 picks up a blank 10 directly from the supply stack and heats the blank while transferring it to the position at which the female mold 65 is located. The blank has its pockets formed at the female mold and is then delivered to a support table 80.

Figure 28:
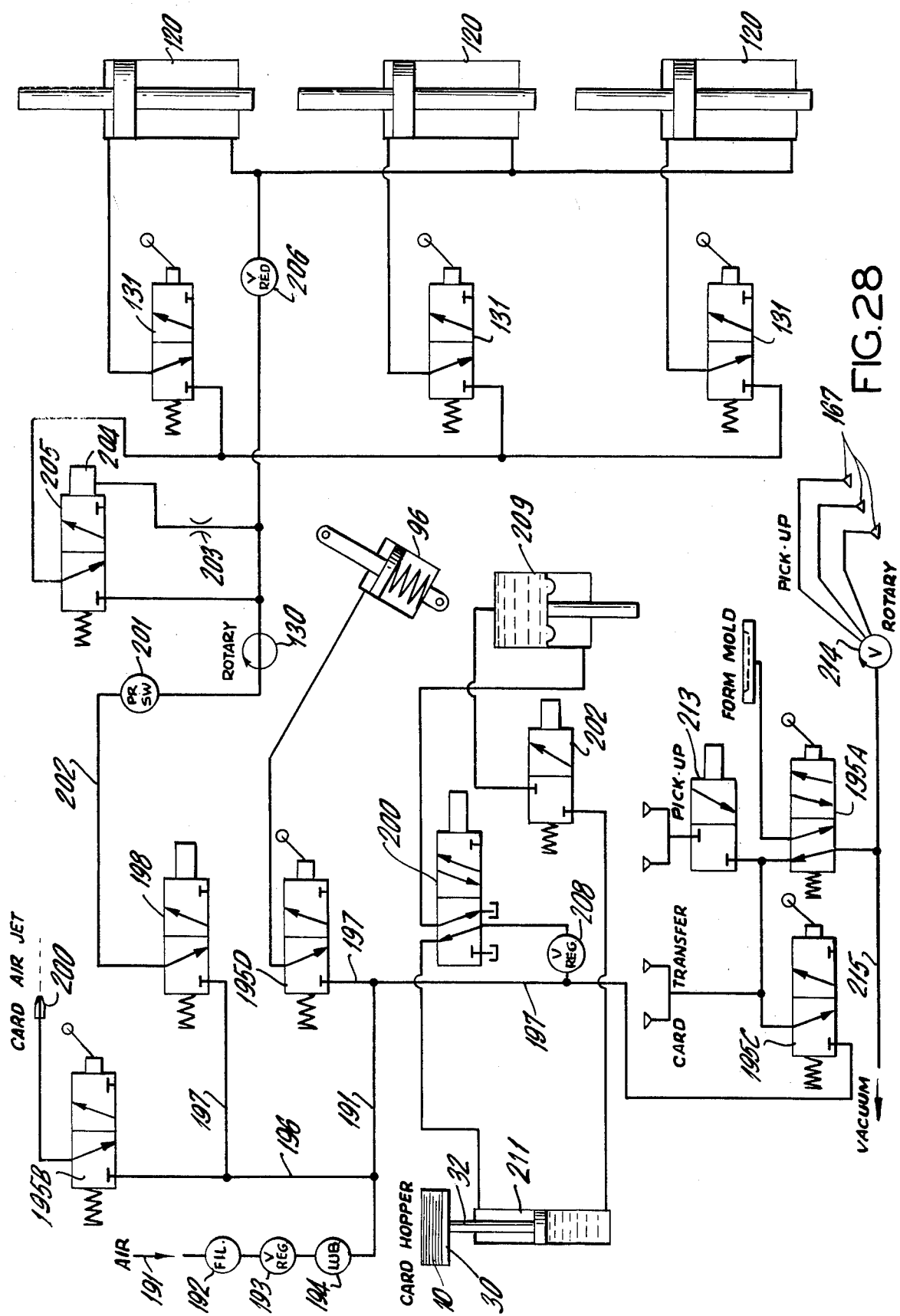
FIG. 28 is a schematic diagram of the air and vacuum lines and controls of the apparatus.

FIG. 28 schematically illustrates the pressure air lines and the vacuum lines and their connections to the various valves and to the operated elements. Referring to FIG. 28, an air line 191, connected to a source of air under pressure, has included therein the usual filter 192, pressure regulator 193 and lubricating device 194. A line 196, connected to air line 191, supplies air under pressure to valve 195B, operated by cam 190B, and controlling the supply of air to an air jet nozzle 200 arranged at blank support table 80 to direct an air jet separating the topmost blank 10 from the blank 10 immediately beneath the topmost blank. A line 197, branched from line 196, supplies air to a solenoid operated valve 198 controlling the supply of air under pressure to the fluid pressure actuators 120 for the heat sealing dies on turret 100. A pressure responsive switch 201 is connected in a line 202 extending from solenoid operated valve 198 and allows operation of dielectric generator 140 if the pressure in line 202 is sufficient for operation of the fluid pressure actuators 120. From switch 201, the air is supplied to the rotary union 130 at the upper end of the turret, and from the turret 130, air is supplied slowly through a restricted orifice 203 to an air pilot 204 for a valve 205. When valve 205 is activated by its air pilot 204, it provides air to the individual valves 131, operated by cam 135, controlling operation of each pneumatic actuator 120. The lower ends of the fluid pressure actuator cylinders are supplied with air, from rotary union 130, through a reducing valve 206, to bias the pistons of the fluid pressure actuators to their upper positions. The individual valves 131, which are operated by cam 135 selectively, supply high pressure air to the upper surfaces of the pistons to move the pistons down to the sealing position.

A line 197 supplies air from line 191 to valve 195D operated by cam 190D and controlling the supply of air to the spring biased fluid actuator 96 controlling the blank folding fingers 95. A regulating valve 208 is connected to air line 197 and supplies air to a manually operated valve 200 controlling the supply of air to an air-oil diaphragm cylinder 211 having the piston rod 32 connected at its upper end to support table 80 for the blanks 10. When in the illustrated right hand position, valve 200 effects lowering of support table 80 and, when valve 200 is moved to the left position, the stack of blanks would rise to its proper level. However, none of this operation will occur unless a solenoid operated valve 202, interposed between cylinder 211 and the hydraulic pressure of accumulator 203, is not activated, to allow oil to flow from cylinder 201 to accumulator 203, and vice versa. Below its connection to regulating valve 208, as illustrated in FIG. 28, line 197 is connected to valve 195C operated by cam 190C, and this valve controls a supply of air pressure to the pick-up cups of the transfer mechanism so that these cups drop off a card after vacuum has been supplied and then cut off. To the right of valve 195C, there is illustrated valve 195A, operated by cam 190A, which, in the illustrated position, supplies vacuum to the pick-up cups of the transfer mechanism. In the opposite position from that illustrated, valve 195A vents the vacuum cups. The vacuum is supplied through a line 215 connected to valve 195A. A solenoid operated valve 213 above valve 195A cuts off either vacuum or air pressure from the last set of suction cups so that no cards will be dilivered to a support table 80 unless valve 213 is energized. Vacuum line 215 is also connected, through a rotary valve 214, to the vacuum cups 167 on the heat sealing dies. The timing of rotary valve 214 is such that completed articles 10' will be carried to and dropped onto discharge conveyor 170 for discharge from the machine.

While it is believed that the operation of the machine will be clear from the foregoing description, it is desired to emphasize an important feature of the apparatus which is the heating of the blanks 10 during transfer from support table 30, or from an idling station, to the female mold. This particular provision of the method of the invention differs substantially from prior art arrangements in which the cards are heated at one station, either after delivery thereto followed by molding, or are heated only after being delivered to the mold. This enormously increases the output per unit time of the apparatus. Further outstanding features of the invention include the various control means for effecting a rapid and accurately timed sequence of operations of the forming and packaging apparatus. The enclosed arrangement for the supply of the dielectric energy from dielectric generator 140 to the heat sealing dies 125, and which prevents radiation to the exterior, also constitutes a very important feature of the invention.

Summarizing briefly, the individual blanks 10 are picked up from support table 11, and transferred step by step to the support tables 80, the individual blanks being heated during transfer from a support surface to a female mold. The molded blanks are then delivered from the female mold to the support tables on the chain conveyor and, while traveling around the chain conveyor, are folded about a median line and held folded while they are passed to the heating dies which complete the heat sealing operation. The heat sealing operation, which is conducted in a completely shielded manner, is followed by delivery of the completed articles 10' to the discharge conveyor 170. While the invention has been illustrated as applied to blanks having only two windows for forming pockets, it should be understood that the blanks may have only one window or as many or these windows as necessary or desirable.

Although the same has not been shown or described, means can readily be provided to prevent delivery of a blank to selected support tables 30, so that these support tables would reach the heat sealing turret 100 without any blanks thereon. This would enable operation of the machine with less than the full number of heat sealing units. In the particular example shown in the drawings, the machine can be operated with either one, two or all three heat sealing units, on turret 100, operative, or with one or two heat sealing units being inoperative.

While specific embodiments of the invention have been shown and described in detail to illustrate the application of the principles of the invention, it will be understood that the invention may be embodied otherwise without departing from such principles.

What is claimed is:

1. In a method for forming and sealing article holding pockets in plastic windows in a series of sheet-like blank members, each member having at least one window opening covered on one surface by a heat formable, heat sealable plastic sheet sealed to said one surface, wherein heat is applied to the plastic sheet and then, at a molding station, pressure is applied to the already heated plastic sheet to cause the plastic sheet to conform to the shape of a female mold and form a pocket, then an article is inserted into the pocket, the said at least one window opening of said blank is superimposed with a further blank member to enclose the article within the pocket and the blank sections are sealed to each other by the application of heat and pressure, the improvement comprising: transporting each blank from a supply station to the molding station and partially forming said packet by heating the plastic sheets covering said at least one window opening of each blank to the molding temperature during said transporting by direct thermal contact of said plastic sheet and a heated die member under differential air pressure, drawing said thus heated plastic sheet through said window opening into a female mold to complete forming of said pocket, transferring said blank to an article insertion station and inserting an article in said pocket, superimposing said blank with a further blank section, sealing said further blank section to said heat sealable plastic sheet by the application of heat and pressure at a sealing station, and wherein a different blank is operated upon at each station.

2. The method of forming and sealing article holding pockets of claim 1, further comprising the step of transporting each blank from the supply station to the molding station by said heated male die member provided with blank pick-up and release means utilizing the heated male die means to position the heated blank in operative relation with said female mold at the molding station; and applying a vacuum to the female mold means to draw heated plastic windows thereinto to form pockets.

* * * * *